UNITED STATES PATENT OFFICE.

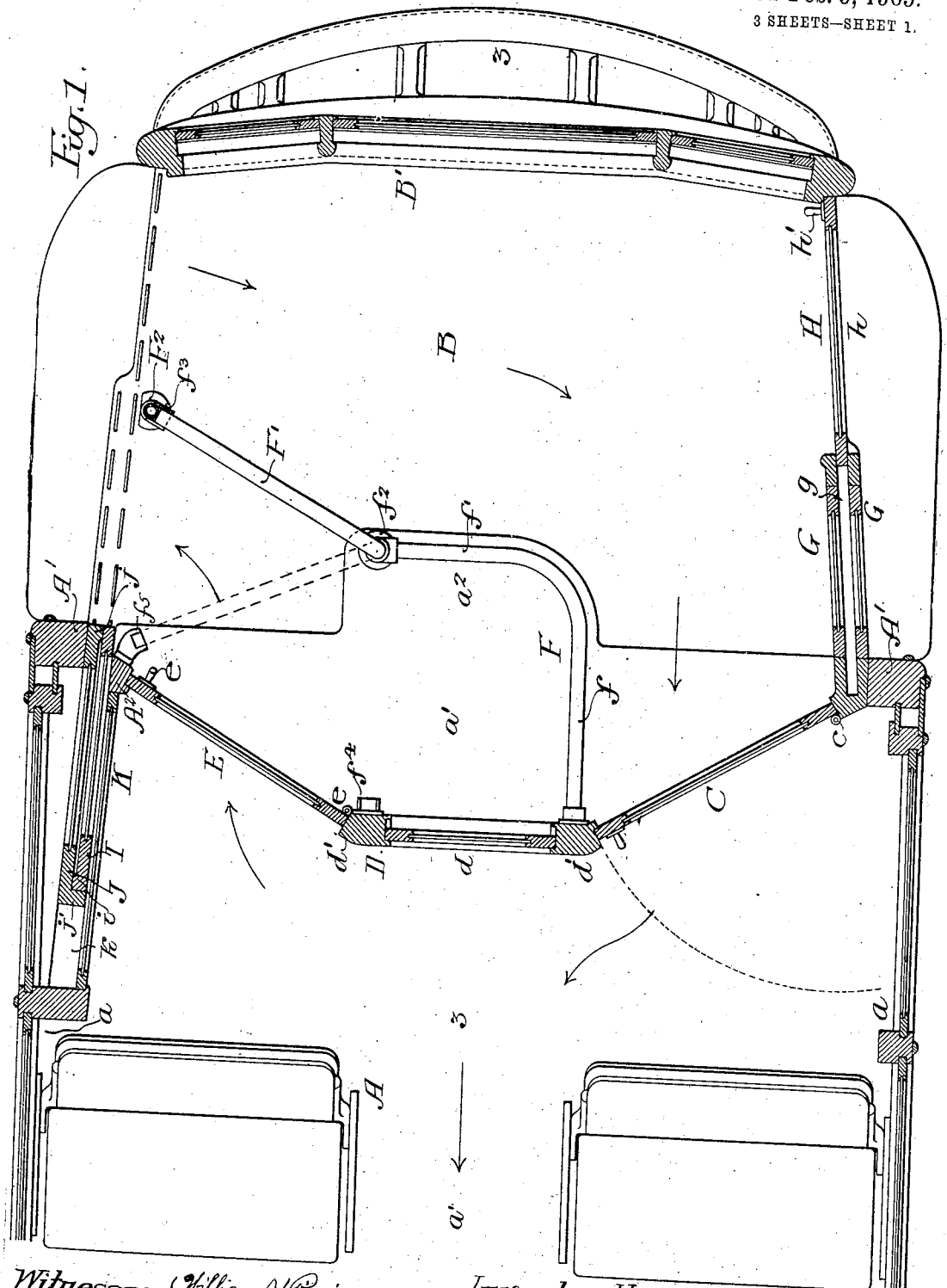

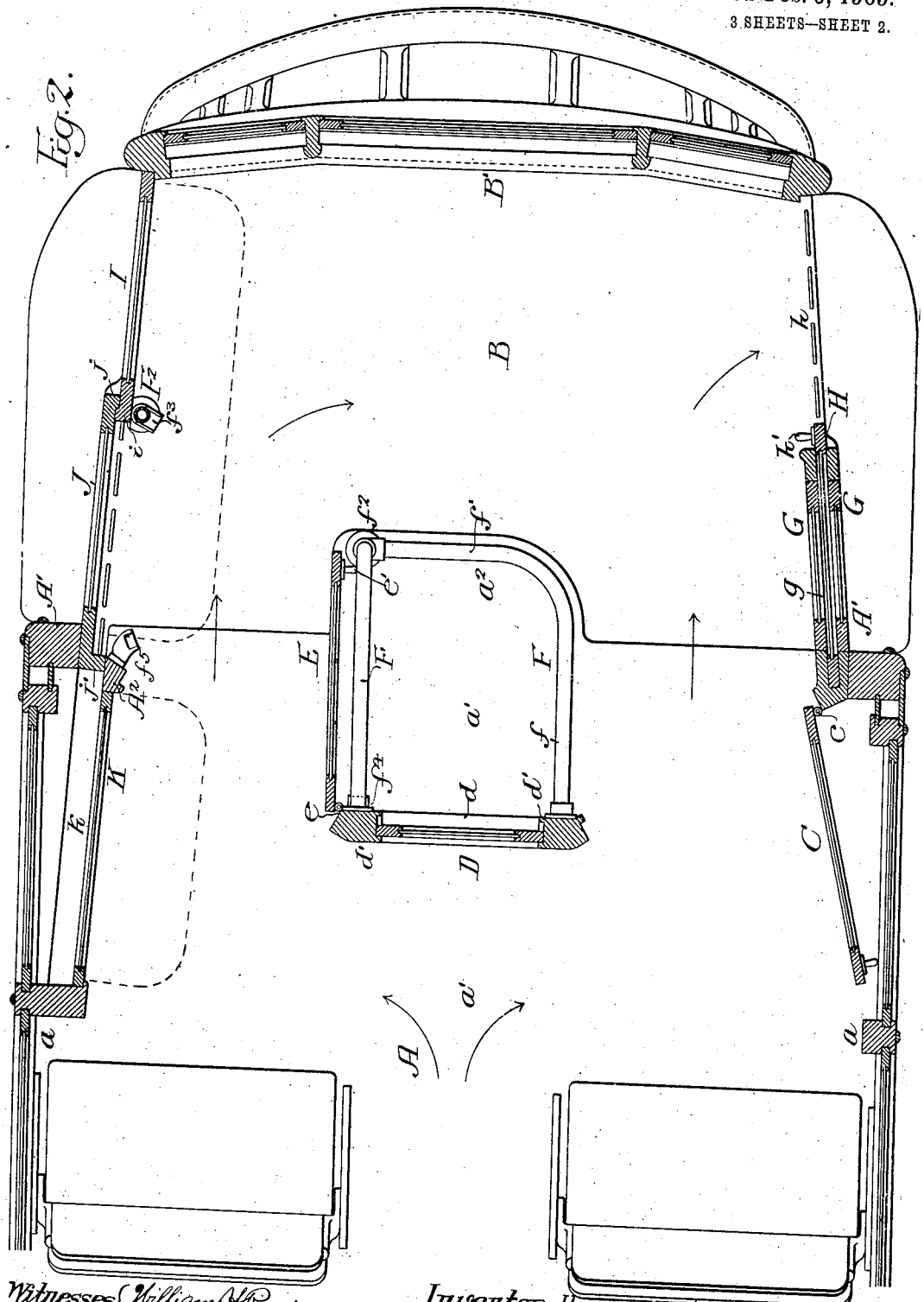

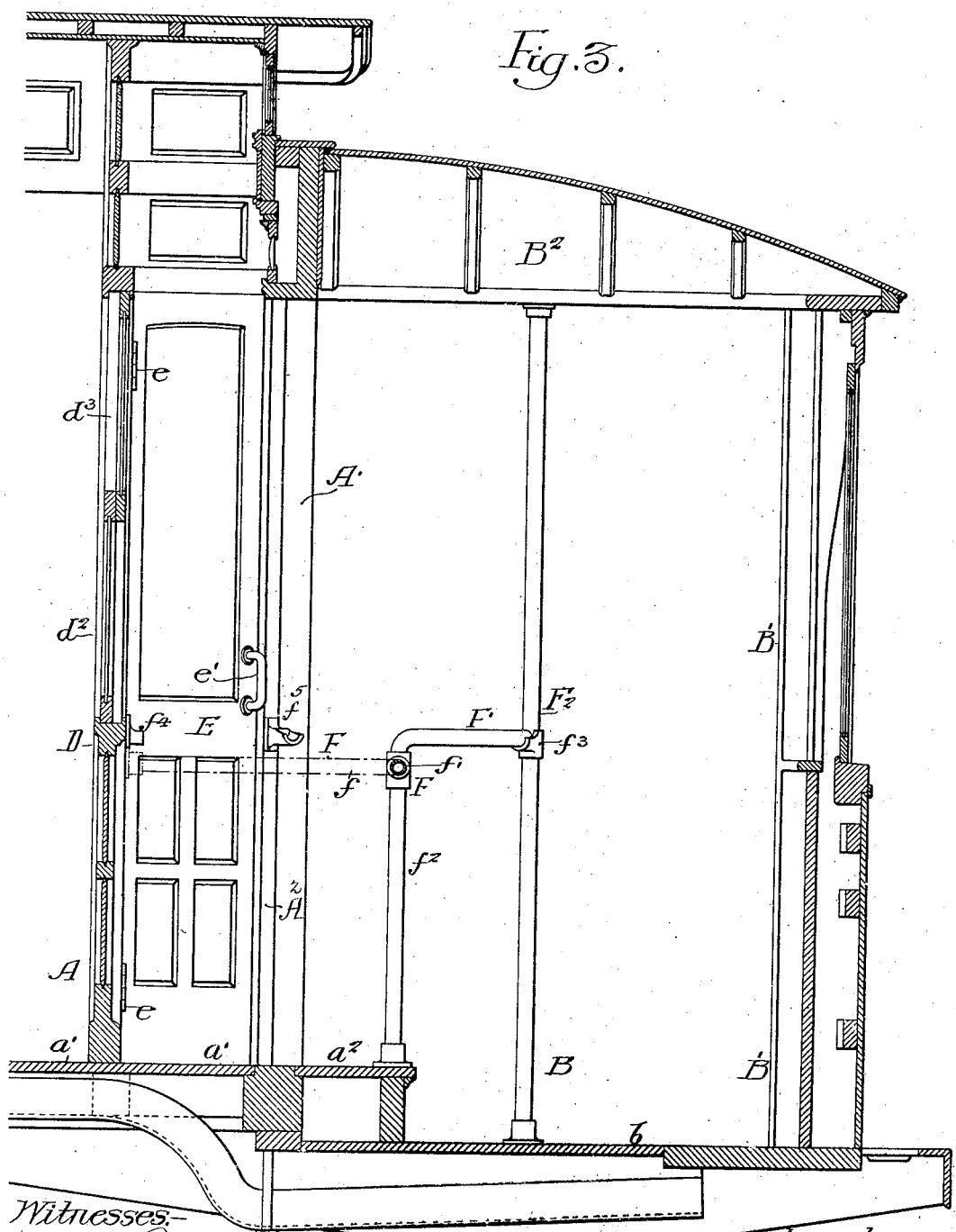

HENRY HOWSON, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

PASSENGER-CAR.

No. 911,987.     Specification of Letters Patent.     Patented Feb. 9, 1909.

Application filed May 12, 1908. Serial No. 432,536.

*To all whom it may concern:*

Be it known that I, HENRY HOWSON, a citizen of the United States, residing in Philadelphia, Pennsylvania, have invented certain Improvements in Passenger-Cars, of which the following is a specification.

My invention relates to certain improvements in passenger cars of the type in which passengers pay their fare on entering the car and particularly the type of car used on street and suburban railways.

One object of my invention is to so convert the ordinary car of this type into a "pay-as-you-enter" car with the least amount of expense and to provide independent ingress and egress passageways, yet allow sufficient space for the conductor on the platform side of the partition separating the platform from the body of the car.

A further object of the invention is to construct the car so that it can be used as a double ended car, the parts being so arranged that the platform at the front end of the car can be entirely inclosed and I also provide an exit door at the front end which may be under the control of the motorman. Furthermore, the doors and the rails can be shifted so as to be entirely out of the way to allow a clear passageway from the body of the car to the platform.

In the accompanying drawings, Figure 1, is a sectional plan view of one end of a passenger car illustrating my invention, the parts being in the position illustrated when the platform is at the rear end of the car; Fig. 2, is a view similar to Fig. 1, the parts being in the position illustrated when the platform is at the forward end of the car; and Fig. 3, is a longitudinal sectional view on the line 3—3, Fig. 1.

A is the body of the car having the usual sides $a$—$a$.

B is the platform of the ordinary type having the front vestibule framing B′.

A′—A′ are the corner posts of the car and usually extending from one corner post to the other is the transverse partition having a doorway therein and separating the body of the car from the platform. The floor $a'$ of the body of the car is usually a step above the floor $b$ of the platform B; the edge of the floor $a'$ extending as indicated in Fig. 1, in line with the outer edge of the corner posts A′.

In converting the ordinary passenger car of this type into a "pay-as-you-enter" car, I cut away the partition between the two posts A′—A′ and substitute therefor a partition D built within the car some distance from the edge of the floor $a'$ as indicated in Fig. 1, and in this partition is a central panel $d$ between two posts $d'$ spaced a given distance apart forming a septum and between the post $d'$ and the corner post A′ are doors C and E. The door C is the ingress door and the door E is the egress door. When the doors are closed, as in Fig. 1, the body of the car is divided from the platform.

The space between the two doors E and C on the platform side of the partition is reserved for the conductor and in order to give him sufficient space and an even floor I preferably extend the body of the car as shown at $a^2$, Figs. 1 and 3, and in order to prevent passengers entering the car by means of the exit door E, I provide a rail F in the present instance having a member $f$ extending on the ingress side of the car and a portion $f'$ at right angles thereto and terminating at a post $f^2$ at the end of the extension of the platform $a^2$ and pivoted to this post is a rail section F′ adapted to a socket $f^3$ on a vertical post F² extending from the floor of the platform to the hood B² of the car. This post separates the ingress and egress passageways at the edge of the platform B. On the other post $d'$ of the partition D is a socket $f^4$ and the rail F′ is so pivoted that it can be swung horizontally to the position shown in Fig. 2 to engage the sockets $f^4$; this rail section $f'$ being above the section F, as indicated in Fig. 3. On a post A² is a socket $f^5$ and if the conductor wishes to cut off the egress passage he can move the rail section F′ to engage this socket, as shown by dotted lines in Fig. 1, increasing the ingress passage to the platform.

The ingress door C is preferably hung at $c$ at the side of the car and swings in so as to allow for the free ingress of passengers after they have paid their fares to the conductor stationed within the rail F. The exit door E is preferably pivoted at $e$ to the post $d'$ on the exit side of the car and swings outwardly towards the space occupied by the conductor. The door is provided with a handle $e'$ which can be easily reached by the conductor when it is desired to open the door to allow passengers to pass out at the rear of the car. Thus the conductor controls both the ingress and egress passages and he is at such a height that he can have a full view of the interior of the car and can readily see over the heads of the passengers on the platform.

The central partition is preferably provided with sashes $d^2$ and $d^3$, one or both of which may be raised or lowered so that when desirable the conductor can call out the streets or answer any questions of the passengers within the car without leaving his post. The upper portion of the partition D can be made to extend to the roof of the car or may terminate below the roof, as desired, the construction of this portion of the partition depending upon the type of car to be converted. One side of the platform is usually closed so that passengers must board or leave the car from one side only.

G—G are fixed panels spaced apart to form a slideway $g$ for the sliding door H which closes the exit doorway $h$ and this door has a handle $h'$ and can be locked by any suitable device. The handle is in such position that when the platform is at the forward end of the car the door can be operated by the motorman.

On the opposite side of the platform B are sliding doors I and J which, when moved to the position shown in Fig. 2, close the ingress and egress sections of the platform and when pushed back out of the way travel in a channel $k$, in a casing K, built on the inside of the car. The door I has a flange $i$ at the inner end which engages a flange $j$ at the outer end of the door J when the door I is pulled out so that the door J is drawn out with it, and on the rear of the door J is a flange $j'$ against which the door I abuts when the door I is moved in the opposite direction to open the passageways, the door J is pushed back with the door I into the channel $k$, as clearly illustrated in Fig. 1.

When the platform is at the rear of the car the parts are in the position shown in Fig. 1, the doors C and E closing the passageways in the partition D. The door H is closed and the doors I and J are open so as to leave a clear passageway for the ingress and egress of passengers at one side of the platform.

The rail $F^1$ is in the position shown so as to divide the ingress passageway from the egress passageway. This construction will give practically as much room for the ingress of passengers as the present platform as the conductor does not occupy any space on the platform and there is a very small space cut off for the egress of passengers.

When the platform is at the forward end of the car, then the doors C and E are thrown back, as indicated in Fig. 2, the doors I and J moved out to close the ingress and egress passageways at one side of the car, and the dividing section of the rail is turned so as to engage the lug $f^4$. The door H can be opened by the motorman when a passenger desires to alight from the car and the door can be readily closed by him without moving from his post. This leaves a clear passage on each side of the central panel of the partition D for the free egress of passengers from the body of the car to the front platform.

This construction requires only a very slight alteration in the present form of standard passenger car and the seating capacity is only slightly reduced. Collapsible seats may be provided along the panel K and along the doors I and J when closed, as shown by dotted lines in Fig. 2, if desired, so as to add to the seating capacity of the car. The inclosed space at the forward end of the car may be utilized for packages, if desired, so as to prevent their accumulating in the aisles.

I claim:

1. The combination in a passenger car, of a body portion having corner posts, a platform at one end of the car beyond the corner posts and open at one side for the ingress or the egress of passengers, and a partition separating the platform from the body portion, said partition extending into the body of the car from the corner posts.

2. The combination in a passenger car, of a body portion, a platform, the floor of the body portion being above the floor of the platform, a transverse partition separating the body portion from the platform and having a doorway therein, the floor of the body portion extending beyond the partition, and means for separating the ingress and egress sections of the platform.

3. The combination in a passenger car, of a body portion, a platform, the floor of the body portion being above the floor of the platform, corner posts at the junction of the platform and the body portion, a partition within the body portion having two doorways therein at an angle, the floor of the body portion extending beyond the partition, and means for separating the platform into ingress and egress sections.

4. The combination in a passenger car, of a body portion, a platform, an angular partition separating the body portion from the platform, said platform being open at one side for the entrance or exit of passengers, two doors in the partition, and a fixed septum separating the doorways, said doorways being arranged at opposite angles in respect to the septum, the doors closing said doorways.

5. The combination in a passenger car, of a body portion, a platform, a transverse partition dividing the body portion from the platform, said partition projecting into the body of the car and having a central pane the partition on each side of the central panel being inclined towards the corner posts of the car, and having doorways therein, doors hung in said doorways, a guard extending from one side of the panel towards the side of the platform, dividing the platform into ingress and egress sections, the space between the central panel of the partition and the guard being of sufficient size to be occupied by the conductor.

6. The combination in a passenger car, of a body portion, a platform, corner posts, the floor of the body of the car extending to the corner posts, a partition projecting into the car from a line drawn from one corner post to the other, and having a central panel and side panels at an angle to the central panel, doorways in the two side panels, doors hung in the doorways, one adapted to swing in and the other adapted to swing out, a guard separating the platform into ingress and egress sections, said guard extending to the partition.

7. The combination in a passenger car, of a body portion, a narrow platform, the floor of the platform being below the floor of the body of the car, a partition extending into the car and having a doorway therein whereby the area of the platform is increased.

8. The combination in a passenger car, of a body portion, a narrow platform, the floor of the platform being below the floor of the body portion, a transverse angular partition extending into the body of the car so as to allow the floor of the body portion to extend beyond the partition, two doorways in the partition, and a guard extending from the partition to one side of the car and separating the space on the platform side of the partition into ingress and egress sections.

9. The combination in a passenger car, of a body portion, a platform, the floor of the platform being below the level of the floor of the car, a central extension of the floor of the car, a transverse angular partition extending into the body of the car, thus increasing the area of the platform, the floor of the body portion and its extension forming a space for the conductor.

10. The combination in a passenger car, of a body portion, a narrow platform, the floor of the platform being below the floor of the car, corner posts in line with the edge of the floor of the car, a projection of said floor extending over the platform, a partition having a central panel and two side panels extending at an angle towards the side posts, doorways in the side panels forming ingress and egress passageways, doors hung in said doorways, the ingress door being hung so as to swing into the body of the car, the egress door swinging outwards towards the platform, and a guard extending towards one side of the platform and dividing said platform into ingress and egress sections.

11. The combination in a passenger car, of a body portion, a platform, the floor of the platform being below the floor of the body portion, corner posts, a transverse partition separating the body portion from the platform, said partition extending into the body portion of the car, the floor of the car extending beyond said partition, two doorways in said partition, one being the ingress doorway and the other the egress doorway, doors mounted in said doorways, the ingress door being arranged to swing into the car and the egress door being arranged to swing outwards towards the platform, a guard rail extending from the platform near the ingress doorway and at an angle towards the side of the car so as to divide the platform into ingress and egress passageways.

12. The combination in a passenger car, of a body portion, a platform, corner posts at the junction of the platform and the body portion, a partition extending into the body of the car and having a central panel, posts on each side of the central panel, doorways on each side of the partition, a guard extending from one side of the partition towards the platform and having a movable member extending to the edge of the platform, said member being arranged to be moved into a position so as to divide the platform into ingress and egress sections or moved to a position so as to form passageways on each side of the platform in line with the said doorways.

13. The combination in a passenger car, of a body portion, a platform, a partition separating the body portion from the platform, a guard rail having an angular fixed section, one angle being parallel with the longitudinal line of the car, a pivoted extension of said guard, said pivoted section being adapted to be placed in position so as to divide the platform into ingress and egress sections or to be moved in position in line with the longitudinal line of the car so as to form clear passageways on each side of the car.

14. The combination in a passenger car, of a body portion, a platform, a transverse partition, the central portion of said partition projecting into the body of the car, doorways in each side of the central partition, doors hung in said doorways, a movable sash in the central portion of the partition, a guard extending from the ingress side of the partition towards the platform and extending over the platform to one side thereof dividing it into ingress and egress sections, the space in front of the central portion of the partition being occupied by the conductor.

15. The combination in a passenger car, of a body portion, a platform, the floor of the platform being below the body portion, corner posts at the junction of the platform floor with that of the body portion, a transverse angular partition, the central portion of said partition extending into the body of the car so as to increase the area of the platform, doorways on each side of the central portion of the partition, doors hung in said doorways, one adapted to swing out over the platform and the other adapted to swing into the body of the car, a rail extending from the ingress side of the partition and at right angles thereto, a post at one side of the platform, a pivoted extension of the rail, said rail and its pivoted extension dividing the platform into ingress and egress sections, a socket on the post and a socket on the partition near the egress doorway, the pivoted section of the rail being adapted to swing into engagement with either of the sockets so as to divide the ingress from the egress passageways at one end of the car or to allow free egress passageways on either side of the central portion of the partition at the opposite end of the car.

16. The combination in a passenger car, of a body portion, a platform, a transverse partition, the central portion of the partition extending into the body of the car thus increasing the area of the platform, doorways on each side of the partition, a guard dividing the platform into ingress and egress sections, a pair of sliding doors arranged to close one side of the platform and the side of the car having a channel for the reception of the sliding doors.

17. The combination of a passenger car having a body portion, a platform, corner posts at the junction of the platform and the body portion, the floor of the platform being below the floor of the body portion, a transverse partition, the side of the car being so formed that there is a channel between one end of the partition and one corner post, and a guard extending from one side of the platform to the partition, two passageways in the partition and two sliding doors adapted to close one side of the platform, one door sliding past the other and one door controlling the movement of the other, the said doors when pushed back entering the channel in the side of the car between the transverse partition and one of the corner posts.

18. The combination in a passenger car, of a body portion, a platform, corner posts, the floor of the platform being below the floor of the body portion of the car, a transverse partition extending from one corner post to the other, the middle portion of the partition projecting into the body of the car, doorways in the angular portions of the partition, one doorway being on one side of the car, the other doorway being on the opposite side of the car, doors hung in the doorways, one door arranged to swing outwards and the other door to swing into the body of the car, a guard extending from the ingress side of the central portion of the partition towards one side of the platform, said guard having a movable section, a pair of sliding doors adapted to close said side of the platform, the body of the car being shaped to receive said sliding doors, and a sliding door adapted to close the opposite side of the platform.

19. The combination in a passenger car, of a body portion, a platform at each end, the floor of each platform being below the body portion of the car, a transverse partition at each end of the body portion, said partition extending into the body portion, each partition having a central panel, a doorway on each side of the panel in each partition, doors hung in said doorways, one door arranged to swing outwardly and the other inwardly, a pair of sliding doors closing one side of each platform, a single sliding door and a fixed panel closing the other side of each platform, a vertical post at the side of the platform inclosed by the two sliding doors, a guard rail extending from one side of the central panel of each partition towards the platform and having an angular section running parallel with the central panel, a post at the end of said angular section in line with the other side of the central panel, a pivoted guard rail on a plane above the fixed guard rail, a socket on the post at one side of the platform and a socket on one side of the central panel so that the pivoted guard rail can be adjusted to divide the platform into ingress and egress sections or to inclose a space at one side of the central panel of the partition so as to leave a clear passageway on either side of the said panel.

In testimony whereof, I have signed my name to this specfication, in the presence of two subscribing witnesses.

HENRY HOWSON.

Witnesses:
 Jos. H. KLEIN,
 WM. A. BARR.